Patented Dec. 11, 1928.

1,694,971

UNITED STATES PATENT OFFICE.

ROBERT A. DUNHAM, OF LONG BEACH, CALIFORNIA, ASSIGNOR TO UNION OIL COMPANY OF CALIFORNIA, OF LOS ANGELES, CALIFORNIA, A CORPORATION OF CALIFORNIA.

TREATMENT OF SPENT CLAYS.

No Drawing. Application filed October 30, 1926. Serial No. 145,379.

My invention relates to the treatment and handling of clay after it has been used for decolorizing and/or refining oil, and after it has been separated from the treated oil by sedimentation and/or filtration. The word clay will be used to denote any silicious, argillaceous or earthy material, of natural or manufactured origin, which is or may be used in oil refining, and this material after it has been used for treating oil will be referred to hereafter as spent clay.

The principal object of my invention is to effect the recovery for commercial uses of both the clay and the adsorbed oil contained therein after the same have passed through a decolorizing and/or refining process.

In the practice of refining oil by means of clay, the oil is mixed with, or percolated through the clay and then separated from the clay by settling, centrifuging or filtering; but any of these processes leaves the spent clay saturated with oil. Spent clay separated by settling may retain from two to three times its weight of oil, and spent clay separated by filtering may retain a third or more of its weight of oil. In any case, the oil retained by the spent clay is of considerable value, and the spent clay resulting from the treatment of volatile oils is highly inflammable. The retained oil can be removed from the spent clay by distillation, but this process is expensive, especially so because of the solid or semi-solid condition in which the spent clay occurs, and because of the fact that spent clay frequently contains acid and hence causes corrosion of the distilling apparatus or requires the addition of a neutralizing reagent.

I have discovered that if spent clay is mixed with water, or with an aqueous solution, e. g. sea water, in proper proportion, a large part of the retained oil will be set free and can easily be separated, entirely free of clay or water, while the clay and water form a non-inflammable plastic mass which can be handled in that condition or thinned by further addition of water to a consistency which permits it to be transported by pumping.

The proportion of water required for de-oiling the spent clay is fixed, within narrow limits, for any given sample of spent clay, although it varies considerably between clays of different origin and character. Certain clays which are commonly used in oil refining require the presence of about equal weights of water and clay to produce the maximum effect. Since the spent clay usually contains some water, due allowance for the initial water content must be made in order to produce the required final water content. If either less or more than the correct proportion of water be added, the oil recovery will be less than the maximum possible recovery.

I prefer to accomplish the de-oiling of spent clay in the following manner:

The spent clay to be treated, be it either settled pulp, or filter cake, or the oil-saturated material discharged from a percolator, is placed in a container or agitator which is provided with a mechanical device for stirring and kneading the charge. With the stirring device in operation, water is admitted gradually, and at such a rate that it is adsorbed at once and only a small amount of free water is present. As the operation proceeds, a gradually increasing amount of oil will appear and the clay will become granular, then lumpy, and will next form a homogeneous, stiff, plastic mass, exhibiting smooth shining surfaces. The oil may either be withdrawn as fast as it appears, and the operation topped when no further yield of oil can be obtained at which time the clay will have attained approximately its maximum consistency, or the oil may be left in the agitator during the operation, and the end of the operation determined by observing either the consistency of the clay or the power required for operating the agitator, both of which reach a maximum when the correct amount of water is present, and decrease rapidly when this amount of water is exceeded. A charge, to which too much water has been added, can be given an addition of spent clay more than sufficient to take up the excess water, and further addition of water can then be made to complete the operation properly.

An alternative method is as follows:—

A definitely known quantity of spent clay is placed in a tank, or reservoir, so as to present a practically level surface. The correct proportion of water to be added is determined by a test wash of a representative sample of the spent clay. The correct quantity of water, as determined by the test wash and by the quantity of spent clay to be treated, is run in on top of the clay, and the whole is allowed to stand until liberation of oil ceases.

Another alternative method is as follows:

A charge of spent clay is placed in a deep, relatively narrow container at the bottom of which water is admitted in indefinite quantity but in such a manner that it is evenly distributed over the transverse area of the container, and at such a rate that a minimum amount of agitation is produced. The water percolates upward through the charge causing liberation and upward displacement of the oil present originally in the spent clay. At any horizontal zone of the charge, that we choose to consider, the upward movement of the water causes the critical degree of watering to be approached, reached, and finally exceeded; but, by the time this last condition is reached, the maximum quantity of oil will have been liberated and removed by upward displacement so that it cannot be re-adsorbed by the over-watered clay.

Typical examples of the results accomplished by my de-oiling process are as follows:—

(1) A sample of spent clay pulp resulting from treatment of gasoline and separated by sedimentation contained 2.7 c. c. of oil per gram of clay (dry weight), and an unknown amount of water. The sample was de-oiled by mixing therewith 0.72 c. c. of water per gram of clay, and the oil liberated amounted to 2.4 c. c. per gram of clay, leaving 0.3 c. c. of oil per gram of clay in the de-oiled material.

(2) A sample of spent clay pulp resulting from treatment of kerosene and separated by sedimentation contained 1.8 c. c. of oil and 0.2 c. c. of water per gram of clay. The sample was de-oiled by mixing therewith 1.00 c. c. of water per gram of clay, and the oil liberated amounted to 1.5 c. c. per gram of clay. The de-oiled material contained 0.3 c. c. of oil and 1.2 c. c. of water per gram of clay.

(3) A sample of spent clay press cake resulting from the treatment of medium grade motor lubricating oil and separated by vacuum filtration contained 0.45 c. c. of oil per gram of clay, and an unknown small amount of water. The sample was de-oiled by mixing therewith 0.74 c. c. of water per gram of clay, and the oil yield was 0.26 c. c. per gram of clay. The de-oiled material contained 0.19 c. c. of oil and 1.12 c. c. of water per gram of clay.

I claim:

1. A method for de-oiling spent clay obtained from oil treating process comprising bringing the spent clay into intimate contact with an experimentally determined optimum quantity of water above or below which the separation of oil from the clay is diminished.

2. A method for de-oiling spent clay obtained from oil treating processes comprising passing an experimentally determined optimum quantity of water in finely divided form through the clay to liberate oil from the clay, the amount of water being such that more or less will result in a diminished separation of oil from clay, and continuing the treatment until the separation of the oil ceases.

3. A method for de-oiling spent clay obtained from oil treating processes comprising bringing the spent clay into intimate contact with a quantity of water approximately equal to the weight of the clay minus the amount of water which may be already contained in the clay.

4. A method for de-oiling spent clay obtained from petroleum treating processes comprising bringing only a predetermined quantity of water into intimate contact with the oily clay, the water being introduced at a gradual rate so that said water as it is admitted is promptly adsorbed and no more than a small amount of unadsorbed water is present at any time.

5. A method for de-oiling spent clay from oil treating processes comprising bringing water into intimate contact with the oil containing spent clay, the water being introduced gradually so that substantially all of it is adsorbed promptly upon introduction, agitating the mass to insure such intimate contact, and continuing the water addition until the mass assumes a stiff homogeneous plastic condition.

6. A method according to claim 5 wherein the water addition is discontinued when the maximum condition of stiffness is obtained, and removing the oil separated by this procedure from the water and clay mass which forms.

7. A method for de-oiling spent clay obtained from petroleum treating processes comprising bringing only a predetermined amount of water into intimate contact with the oily clay, and regulating the admission of the water to the clay so that only a small amount of unadsorbed water is in contact with the clay at any time.

8. A method for de-oiling spent clay obtained from petroleum treating processes comprising bringing water into intimate contact with the clay, and regulating the admission of water to the clay so that only a small amount of unadsorbed water is in contact with the clay at any time.

9. The method of de-oiling spent clay containing oil which comprises bringing the oil-containing spent clay into contact with an experimentally predetermined optimum amount of water sufficient to convert the clay into a homogeneous plastic condition and separating the clay from the water.

Signed at Wilmington, in the county of Los Angeles and State of California, this 23rd day of October A. D. 1926.

ROBERT A. DUNHAM.